Jan. 20, 1953    C. F. ERIKSON    2,626,015
LUBRICANT DISTRIBUTOR
Filed July 19, 1949    6 Sheets-Sheet 1

INVENTOR.
CARL F. ERIKSON
BY
Walter E. Wallheim
ATTORNEY.

Jan. 20, 1953     C. F. ERIKSON     2,626,015
LUBRICANT DISTRIBUTOR Filed July 19, 1949     6 Sheets—Sheet 2

INVENTOR.
CARL F. ERIKSON
BY
Walter E. Wollheim
ATTORNEY.

Jan. 20, 1953  C. F. ERIKSON  2,626,015
LUBRICANT DISTRIBUTOR
Filed July 19, 1949  6 Sheets-Sheet 4

INVENTOR.
CARL F. ERIKSON
BY
Walter E. Wallheim
ATTORNEY.

Jan. 20, 1953    C. F. ERIKSON    2,626,015
LUBRICANT DISTRIBUTOR
Filed July 19, 1949    6 Sheets-Sheet 5

INVENTOR.
CARL F. ERIKSON
BY
Walter E. Wallheim
ATTORNEY.

Jan. 20, 1953 C. F. ERIKSON 2,626,015
LUBRICANT DISTRIBUTOR

Filed July 19, 1949 6 Sheets—Sheet 6

INVENTOR.
CARL F. ERIKSON
BY
Walter E. Wollheim
ATTORNEY.

Patented Jan. 20, 1953

2,626,015

UNITED STATES PATENT OFFICE 2,626,015

LUBRICANT DISTRIBUTOR

Carl F. Erikson, White Plains, N. Y., assignor, by mesne assignments, to Nathan Manufacturing Corp., a corporation of New York Application July 19, 1949, Serial No. 105,502

7 Claims. (Cl. 184—35)

This invention relates to improvements in lubricant distributors, and is particularly adapted to be employed in centralized lubrication systems. i. e. systems in which the feeding of a lubricant to a number of points is controlled and effected by a single device.

It is the particular object of the invention to provide a distributor which can be used on engines, machine tools, and many other mechanical structures in which a lubricant supply can be fed to the distributor which will then discharge the lubricant successively through a number of its outlets by virtue of a novel control means operated, preferably, by a moving part of the structure to which the distributor is attached.

Another object is to provide means for group adjustment of the amount of lubricant discharged from each of the outlets of the distributor.

A further object is to provide means in the distributor optionally to vary the lubricant discharged from its outlets in predetermined amounts by combining the discharges from two or more outlets and ejecting the combined discharges from one outlet only.

A still further object is to make the distributor especially applicable to internal mechanism of engines and the like by reason of its compactness and small physical dimensions whereby such distributors can readily be built in and provide a complete automatic lubrication system for such machines.

Still other objects will become apparent in the following specification illustrated by the accompanying drawings.

In the drawings.

Like characters of reference denote similar parts throughout the several drawings and the following specification.

Generally, the distributor consists of a housing which has a lubricant inlet and a plurality of radially arranged outlet ports. The housing contains a rotatable block having a cylinder within which a piston is reciprocated. The block has one outlet passage so disposed that it can register successively with one of the radially arranged outlet ports in the housing when the block is rotated. A shaft projecting from the housing is, preferably, actuated by a moving part of the structure to which the distributor is attached. The shaft operates a driver within the housing which has a reciprocatory and rotary motion. By suitable mechanism, the block is held stationary during the inward travel of the driver while the outlet passage in the block and one of the outlet ports in the housing are in register and while the piston discharges the lubricant in the cylinder through the passage and port. During the return or outward travel of the driver, the block is rotated by suitable ratchet means to a position in which its outlet passage registers with another outlet duct in the housing. During this return travel the cylinder is again filled with a lubricant, and the device is ready for another cycle of operation.

More specifically, 20 is a housing of the distributor having a head 21, a mounting flange 22 and an extension 23, all longitudinally disposed on a common axis. 24 is a chamber in the housing having one end closed by a wall 25 in the head 21 and its other end by a bushing 26 screwed into the end of extension 23. 27 is an oil inlet through the head 21, tapped for a suitable pipe and leading to chamber 24. 28 are a plurality of oil outlets in the head 21 in annular formation, each outlet connected by a passage 29 to a duct 30 at right angles thereto and leading to chamber 24. A ball check 31, biased by a spring 32, shuts off duct 30 from passage 29.

33 is a shaft exteriorly projecting from extension 23 of the housing 20 and slidingly fitted within a central bore of bushing 26. Shaft 33 has an enlarged member 34 within the chamber 24 of the housing and is slidingly disposed therein forming a reciprocable and rotatable driver as will be explained more in detail later on. 35 are helical grooves in driver 34 engaged by pins 36 in the wall of extension 23. These grooves have the same lead and hand of rotation and are equally spaced with respect to the center of the driver.

37 is a cylinder block fitted within chamber 24 provided with a radial outlet passage 38 adapted to communicate successively with each of the ducts 30 when rotated. 39 is an extension to the block 37 having a cylindrical bore 40 through its center and a cross passage 41 communicating with the chamber 24. 42 is a check valve, biased by a spring 43, for closing off communication between cylindrical bore 40 and outlet passage 38 in the block. 44 is a cap over valve 42 and spring 43 acting as a stop for the block 37 against the wall 25 within chamber 24 when its outlet passage 38 is in line with one of the ducts 30.

45 is a piston slidingly fitted into cylindrical bore 40 of the block 37 having a small head 46 which abuts the bottom of a recess 47 in driver 34. 48 is a ratchet disc within the chamber 24 having a central opening 49 somewhat larger in diameter than the outside of extension 39 of the cylinder block 37. One face of disc 48 abuts the cylinder block 37 and has a recess 50 provided with ratchet teeth 51. The other face of disc 48 is provided with one or more guide pins 52 projecting therefrom and slidingly fitted into driver 34. 53 are pawls guided within recesses 54 of the cylinder block 37, having teeth 55 engaging teeth 51 of the disc 48. Springs 56 in recesses 54 force teeth 55 toward teeth 51. 57 is a spring surrounding cylindrical extension 39 of the cylinder block 37 having one end contact the ratchet disc 48, its other end abutting a follower 58 around the piston 45 adjacent its head 46. Spring 57 tends to force the ratchet disc 48 against the cylinder block 37, and the piston head 46 against the bottom of recess 47 in driver 34, and the driver 34 against bushing 26 in the housing 20. 59 are passages through the cylinder block 37 connecting the inlet end of the housing 20 with the chamber 24 at the other side of the block for the passage of oil.

60 is an index pin in the head portion 21 of the housing, biased by a spring 61, and surrounded by a cap 62, to engage recesses 63 in the face of the block 37. There are as many recesses as there are outlet ducts 30, and the index pin engages one of the recesses 63 when outlet passage 38 in the block is in line with one of the ducts 30 in the housing.

64 is a pin slidingly disposed in wall 25 of the housing 20 having an enlarged end 65 within the chamber 24 and a handle knob 66 at its exteriorly projecting end. End 65 is adapted to contact cylinder block 37 for purposes explained later.

Figure 1:
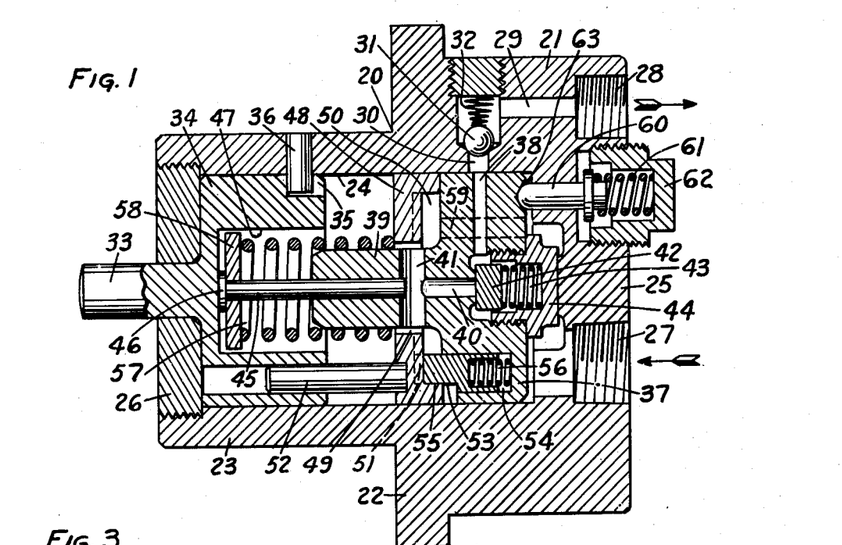
Fig. 1 is a longitudinal sectional view through the distributor shown before the beginning of its pumping stroke, the view being taken in several planes to illustrate the mechanism better.
Figure 2:
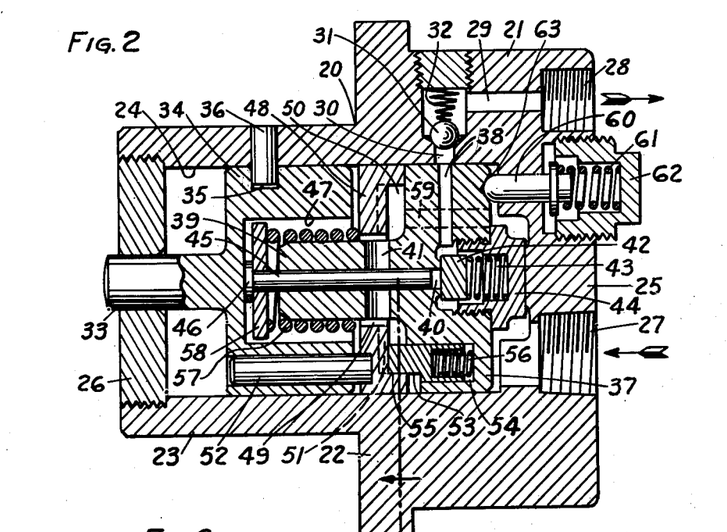
Fig. 2 is a similar sectional view shown at the end of its pumping stroke.
Figure 3:
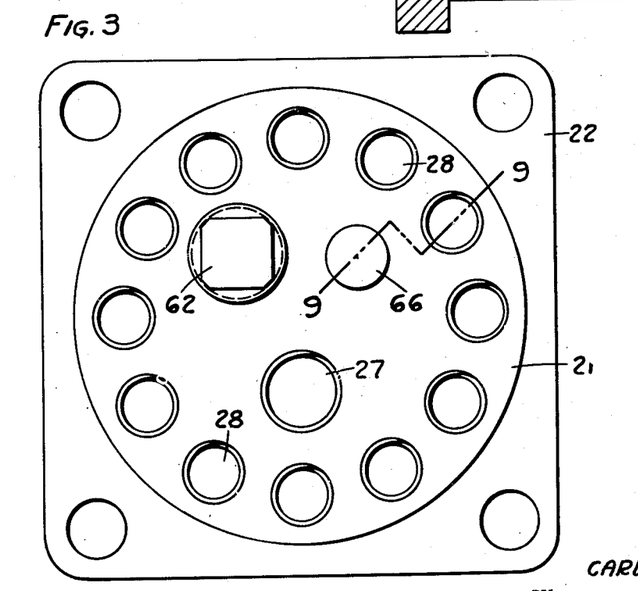
Fig. 3 is an end view of the distributor.
Figure 4:
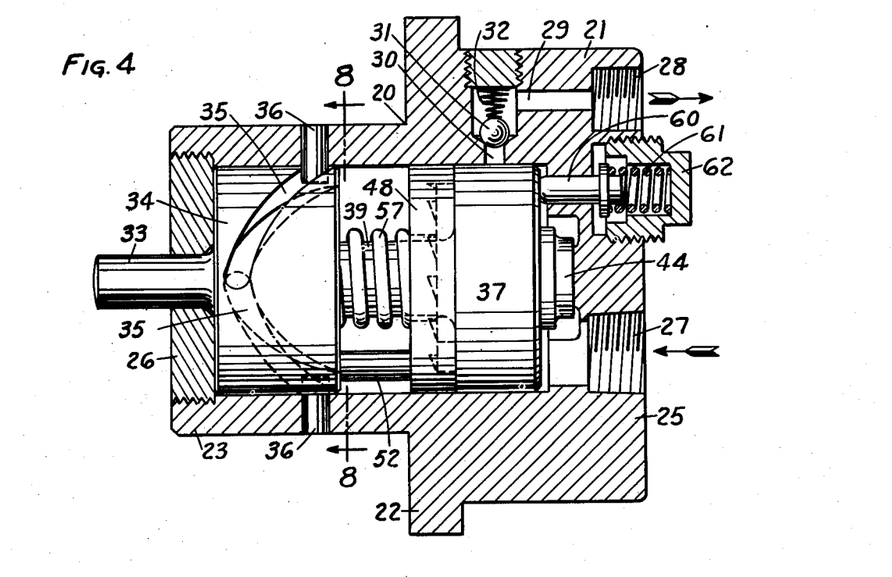
Fig. 4 is a view similar to Fig. 1 but showing part of the inner operating mechanism in elevation.

The distributor is attached to a machine by bolting the mounting flange to it. The shaft 33 is given a reciprocating constant stroke by an eccentric, cam, or other operating part of the machine. Fig. 1 shows the shaft at the beginning of the stroke. The driver 34 is at the extreme left hand end of chamber 24 in the housing. The piston 45 projects into cross passage 41 permitting oil from inlet 27, by way of passages 59 through the cylinder block 37, to enter and fill the cylindrical bore 40 in the block just ahead of the piston end. While moving inwardly, driver 34 is rotated in a clockwise direction by virtue of the helical grooves 35 which engage stationary pins 36. This also causes the ratchet disc 48 to rotate and slide past the teeth 55 of the pawls 53. While this takes place the cylinder block 37 is held stationary by the index pin 60 which engages the nearest recess 63 in the block when its outlet passage 38 is in register with one of the ducts 30 in the housing. During this inward movement of driver 34, the piston 45 enters cylindrical bore 40 in the block and forces oil past check valve 42 through passage 38, past ball check 31, through passage 29, to be discharged from outlet 28. The position of the inner mechanism of the distributor at the end of the inward stroke is indicated in Fig. 2.

The cam, eccentric, or other operating medium now permits the shaft to return to its original position. During the return movement, the spring 57 forces the driver 34 of the shaft outwardly toward the actuating member for the shaft, the driver rotating in a direction opposite to that during its inward movement, namely counter-clockwise. The cylinder block, during this return movement, is also rotated counter-clockwise because teeth 51 of the ratchet disc 48 grip the teeth 55 of the pawls and rotate the block until at the end of the return travel the index pin 60 again holds the block in place, registering passage 38 and the next duct 30 in the housing. During this return travel the cylindrical bore 40, as soon as piston 45 leaves it, is again filled with oil from the chamber 24 and the device is ready for its next inward travel.

Figures 5, 7:
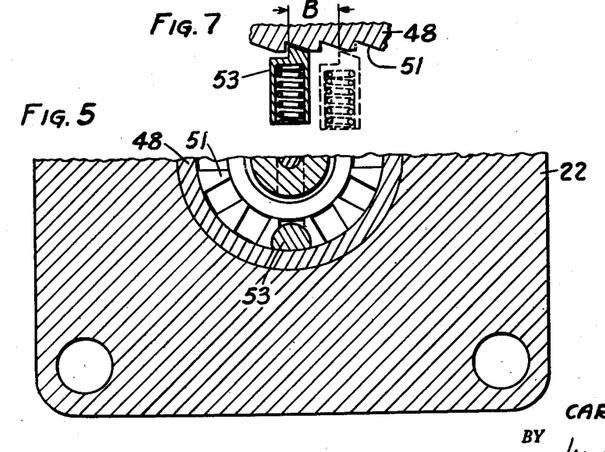
Fig. 5 is a fragmentary sectional view along the plane of line 5—5 in Fig. 2.
Fig. 7 is a view similar to Fig. 6 at maximum stroke.

In Fig. 7, which shows a development of the relative positions of the pawl and the ratchet disc, the reciprocation of the shaft 33 which imparts to the block a rotary motion in one direction, as explained before by virtue of the helical grooves 35, has a maximum stroke, indicated as "B," this being the maximum arcuate distance the ratchet disc 48 will move during the inward movement of the shaft. During this movement, the piston 45, also has its maximum stroke, while the outlet passage 38 of the block registers with one of the ducts 30 in the housing by virtue of the index pin 60 holding the block 37 stationary. The amount of oil proportional to the full stroke of the piston 45 will therefore be discharged from the outlet of the distributor.

Figure 6:
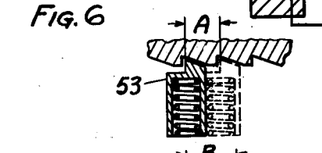
Fig. 6 is a development of a sectional view of a driving pawl and its relation to a ratchet disc at a stroke less than maximum.
Figure 8:
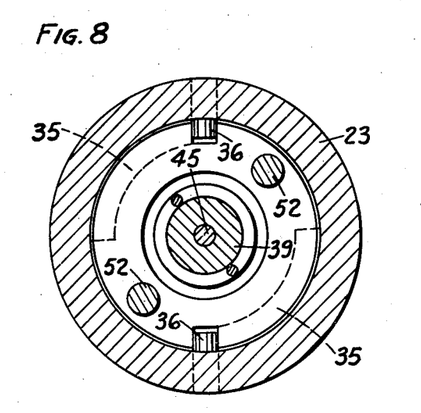
Fig. 8 is a cross sectional view along the plane of line 8—8 in Fig. 4.

In Fig. 6, which is a view similar to Fig. 7, a reciprocation of the shaft less than the maximum is indicated as "A." This is approximately one-half of the maximum, this depending upon the number of ratchet teeth in the disc 48. During this reciprocation, the amount of oil discharged is again proportional to the stroke of the piston 45 which is now about one-half of the full stroke. While the minimum reciprocation of the shaft has been referred to as one-half of the maximum, by providing smaller ratchet teeth, this minimum can obviously be greatly reduced.

For the proper indexing of the cylinder block 37, it is essential that the number of teeth in the ratchet disc 48 is, preferably, the same as the number of outlets in the housing, although multiples of that number may be used. The driver 34, after the pawls in the block have engaged a ratchet tooth in the disc, must return always to the same position i. e. the position in which the outlet passage 38 of the block is in register with one of the ducts 30 in the housing after each stroke of the piston or, in other words, at the end of its return or counter clockwise travel. The index pin 60 at that time must engage one of the recesses 63 which insures continuous alignment between passage 38 and one of the ducts 30 during the pumping stroke.

During the clockwise rotation of the driver 34 i. e. its inward travel, the ratchet disc must rotate sufficiently to permit the pawls in the block 37 to slide past at least one tooth. The driver 34 may rotate beyond one tooth provided the pawls do not engage a second tooth. Because the rotation of the driver and its reciprocation depending thereon control the travel of the piston 45, the amount of rotation over one tooth may be used to vary the piston stroke, so that the maximum rotation would result in a maximum stroke of the piston, and the minimum rotation which insures proper indexing becomes the minimum stroke of the piston. This range of adjustment is shown in Figs. 6 and 7, referred to above.

Figure 9:
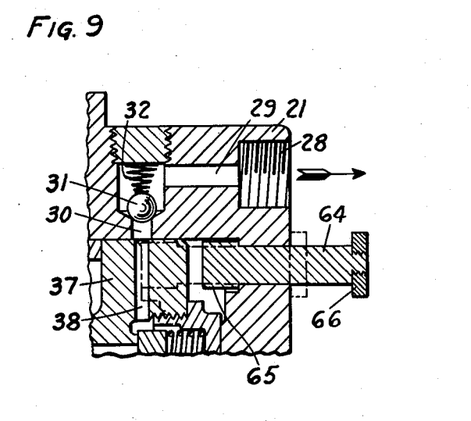
Fig. 9 is a fragmentary cross sectional view along the plane of line 9—9 in Fig. 3.

Oil is generally admitted into the housing under a pressure sufficient at least to fill the housing. In making initial installations, it is often found desirable to fill the pipes connected to various points to be lubricated with oil. This can readily be accomplished by pushing pin 64 inwardly which in turn will move cylinder block 37 to the left until ducts 30 are in communication with chamber 24 of the housing at the right of the block. At that time, oil under pressure will be forced past ball checks 31 to be discharged from outlets 28 to fill all pipes connected to the outlets at one time. These positions of the cylinder block 37 and pin 64 are shown in dotted lines in Fig. 9.

Figure 10:
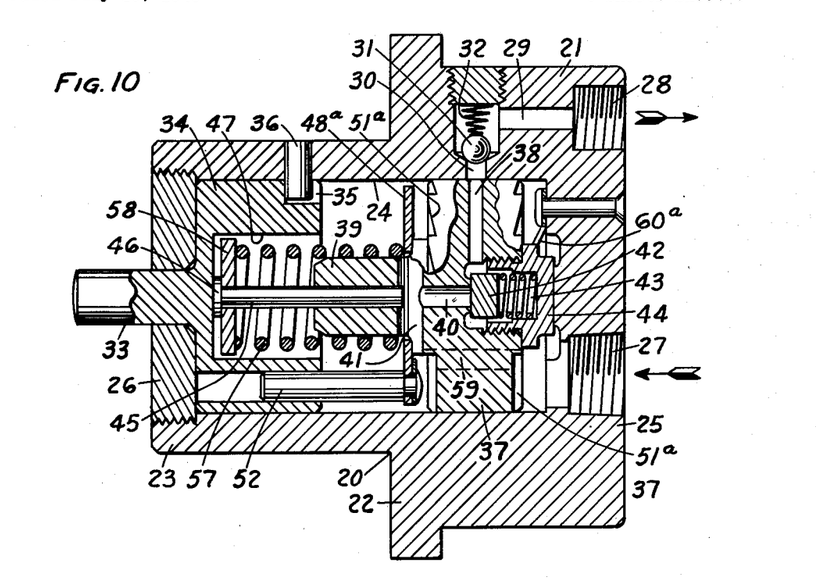
Fig. 10 shows a modified form of distributor in a position corresponding to Fig. 1.
Figure 11:
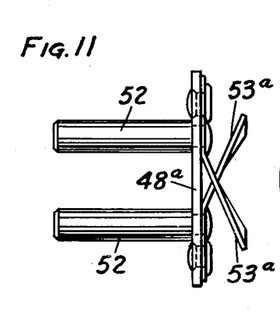
Figs. 11 and 12 show, respectively, a side view and an end view of a ratchet disc and pawls used in the modification of the distributor illustrated in Fig. 10.
Figure 12:
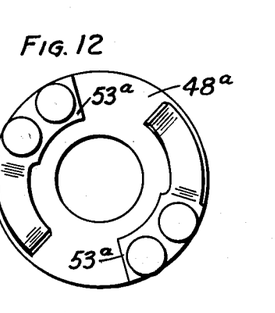
Figure 13:
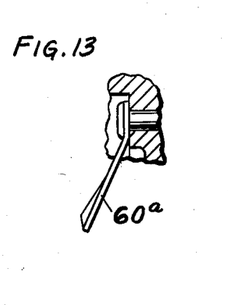
Fig. 13 is a side view of a counter-pawl used in the same modification.

In a modification shown in Fig. 10, the cylinder block 37 is provided with teeeth 51a and a ratchet disc 48a which carries flat upturned springs 53a serving as pawls to take the place of disc 48 and pawls 53. Figs. 11 and 12 show disc 48a and springs 53a. 60a is a counter pawl of a construction similar to springs 53a riveted to the wall 25 of housing 20 which serves the same purpose as index pin 60 in the construction disclosed in Fig. 1.

In the distributors described so far, the rate of discharge from the outlets can be varied by adjusting the stroke of shaft 33 by changing cams, or by many other means well known in the art. This, however, does not change the uniformity of discharge from all outlets. In other words, at full stroke, the discharge from each of the outlets may be $m$. At one-half stroke, the discharge from each of the outlets would be $$\frac{m}{2}$$

Figure 14:
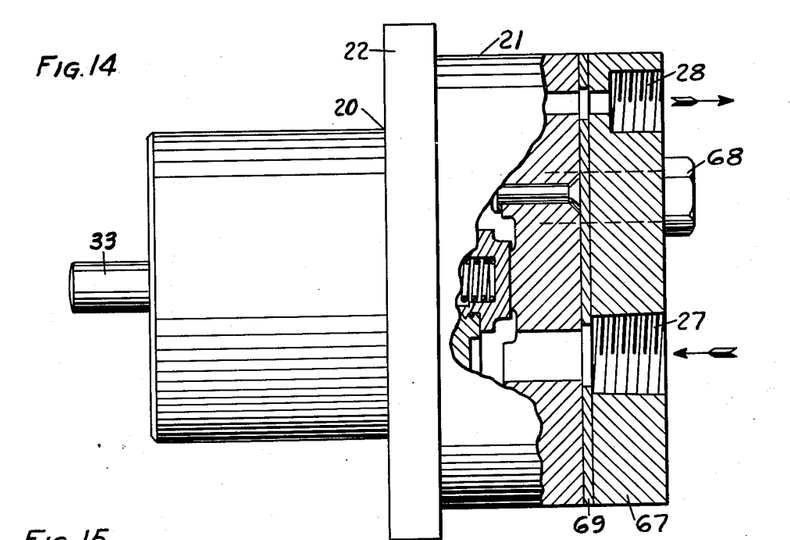
Fig. 14 is an exterior view of the distributor, partly in section, showing a modification in which several feeds or discharges can be combined to discharge through one outlet only.
Figure 15:
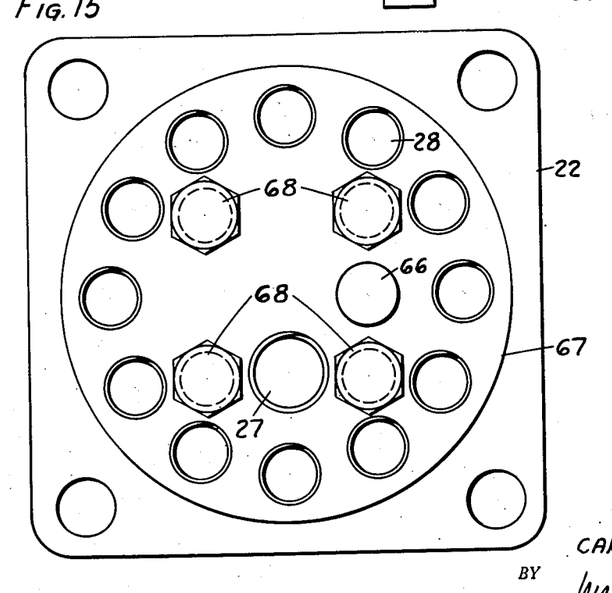
Fig. 15 is an end view of the distributor shown in Fig. 14.

In certain cases, it will be found advantageous, however, to change the rate of discharge from different outlets, this rate to be predetermined before the distributor is applied to a machine. This can readily be achieved by a modification of the device illustrated in Fig. 14 which is applicable to either of the distributor structures described before. The head 21 is provided with a flange 67 which is fastened to the head by suitable bolts 68. A gasket 69 is interposed between the head and the flange. Flange 67 is provided with the same number of outlets and an inlet, index pin and push pin for filling pipes, as the head of the distributor shown in Fig. 1. The gasket 69 has openings which register with the outlets and inlet as well as other appurtenances in the flange, so that the functioning of this modified distributor will be the same as those described before. The discharge from each of the outlets will be the same during a stroke. The gasket 69 is shown in plan view in Fig. 16.

Figures 16, 17, 18:
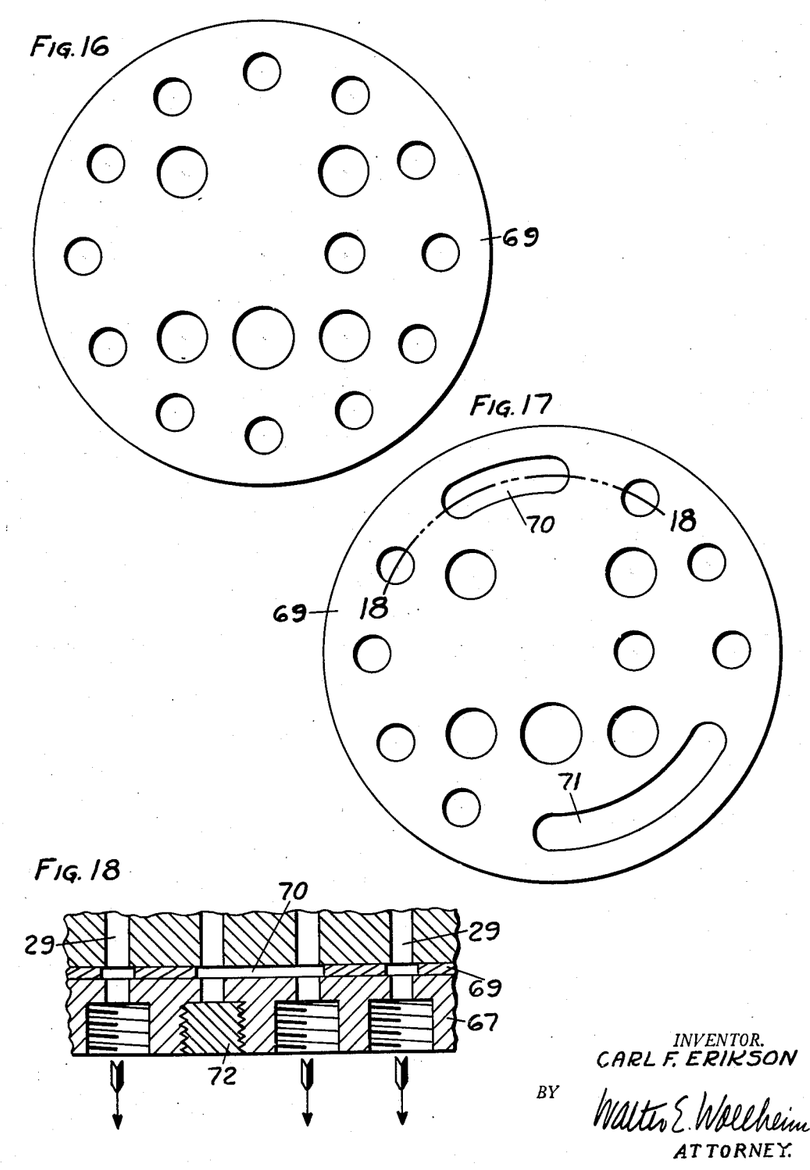
Fig. 16 is a plan view of a gasket used in the distributor of Fig. 14 perforated for individual discharges.
Fig. 17 is a view similar to Fig. 16 showing the gasket perforated so as to combine the discharges from several feeds into one feed line.
Fig. 18 is a fragmentary cross sectional view along the plane of line 18—18 in Fig. 17 showing parts of the housing and flange adjacent the gasket.

Should it be desired now to increase the discharge from one of the outlets to that of twice its amount, or to one three times its amount, for instance, it is only necessary to provide a gasket in which the perforations which register with each outlet in the flange 67 are changed to connect two or more of these perforations and plug one or more of the outlets, so that the discharge from two or more outlet passages in the head is diverted to and combined in one outlet. A gasket so changed is shown in Fig. 17 in which 70 shows an elongated perforation combining two discharges, and an elongated perforation 71 combining three discharges. The sectional view in Fig. 18 shows the discharge of two outlets combined in one, and a plug 72 closing off one of the outlets. In this manner any desired range of rates of discharges can be predetermined in multiples of a unit discharge by furnishing with the device gaskets perforated accordingly.

Instead of reciprocating the shaft by a moving part of the structure to which the distributor is attached, reciprocation can also be effected by manual means, such as a hand lever and the like.

While in the drawings the driver 34 is shown as an integral part of the shaft 33 which is actuated by a reciprocating part of the structure to which the distributor is attached, these two parts can be separated and a flattened end of the shaft engage a slot in the driver. In such case the shaft need not be reciprocated, but simply rotated. This motion would in turn provide for reciprocation of the driver which still would be rotated by means of the helical grooves and pins or their equivalents. In place of the ratchet and pawl means shown, it is understood that any of the commercially obtainable ratchet movements may be used, such as roller ratchets, for instance, answering the same purpose.

It is obvious, therefore, that many other changes in the form, proportion, combination of parts and minor details of construction may be resorted to without departing from the principles or sacrificing any of the advantages of the invention, as defined in the appended claims.

What I claim as new, is:

1. A lubricant distributor comprising a housing defining a chamber and having an inlet and a plurality of outlets communicating with the chamber, a cylinder block rotatably fitted within the chamber having a cylindrical bore in communication with an outlet passage in the block, means to rotate the cylinder block to bring its outlet passage successively in register with each of the outlets in the housing including a driver within the chamber, a shaft projecting from the housing and movable relative thereto, means wholly within the chamber and including a spring for effecting combined reciprocatory and oscillatory movement of the driver in response to movement of the shaft, and ratchet means wholly within the chamber and coacting with the driver and the block, a piston operated by the driver adapted to enter the cylindrical bore in the block and force lubricant therefrom during the inward travel of the driver, resilient means normally and yieldingly holding the block stationary relative to the housing during the inward travel of the driver when the outlet passage in the block is in register with one of the outlets in the housing, and means including said spring for returning the driver and piston, upon completion of the inward travel of the driver, to their initial positions, said ratchet means comprising a disc, having ratchet teeth, slidably attached to the driver and rotating in unison therewith, and pawls in the block, the teeth of the disc sliding past the pawls in the block during the inward travel of the driver, while during the return travel of the driver the teeth grip the pawls and rotate the block to register the block outlet passage with another outlet in the housing.

2. A lubricant distributor comprising a housing defining a chamber and having an inlet and a plurality of outlets communicating with the chamber, a cylinder block rotatably fitted within the chamber having a cylindrical bore in communication with an outlet passage in the block, means to rotate the cylinder block to bring its outlet passage successively in register with each of the outlets in the housing including a driver within the chamber, a shaft projecting from the housing and movable relative thereto, means wholly within the chamber and including a spring for effecting combined reciprocatory and oscillatory movement of the driver in response to movement of the shaft, and ratchet means wholly within the chamber and coacting with the driver and the block, a piston operated by the driver adapted to enter the cylindrical bore in the block and force lubricant therefrom during the inward travel of the driver, resilient means normally and yieldingly holding the block stationary relative to the housing during the inward travel of the driver when the outlet passage in the block is in register with one of the outlets in the housing, and means including said spring for returning the driver and piston, upon completion of the inward travel of the driver, to their initial positions, said ratchet means comprising a disc, having ratchet teeth, slidably attached to the driver and rotating in unison therewith, and pawls in the block, the teeth of the disc sliding past the pawls in the block during the inward travel of the driver, while during the return travel of the driver the teeth grip the pawls and rotate the block to register the block outlet passage with another outlet in the housing, the number of teeth being complete teeth in multiples of the number of outlets in the housing, during the maximum rotation of the driver and its inward travel the pawls sliding past the number of teeth per outlet plus nearly one additional tooth for maximum adjustment, and for minimum adjustment sliding past the number of teeth per outlet only.

3. A lubricant distributor comprising a housing defining a chamber and having an inlet and a plurality of outlets communicating with the chamber, a cylinder block rotatably fitted within the chamber having a cylindrical bore in communication with an outlet passage in the block, means to rotate the cylinder block to bring its outlet passage successively in register with each of the outlets in the housing including a driver within the chamber, a shaft projecting from the housing and movable relative thereto, means wholly within the chamber and including a spring for effecting combined reciprocatory and oscillatory movement of the driver in response to movement of the shaft, and ratchet means wholly within the chamber and coacting with the driver and the block, a piston operated by the driver adapted to enter the cylindrical bore in the block and force lubricant therefrom during the inward travel of the driver, said piston including a head abutting the bottom of a recess in the driver, resilient means normally and yieldingly holding the block stationary relative to the housing during the inward travel of the driver when the outlet passage in the block is in register with one of the outlets in the housing, and means including said spring for returning the driver and piston, upon completion of the inward travel of the driver, to their initial positions, said spring being disposed between the piston head and the ratchet means, forcing the ratchet means to remain in contact with the block and the piston head in contact with the driver, the ratchet means being adapted to rotate the cylinder block during the return travel to register its outlet passage with another outlet in the housing.

4. A lubricant distributor comprising a housing defining a chamber and having an inlet and a plurality of outlets communicating with the chamber, a cylinder block rotatably fitted within the chamber having a cylindrical bore in communication with an outlet passage in the block, means to rotate the cylinder block to bring its outlet passage successively in register with each of the outlets in the housing including a driver within the chamber, a shaft projecting from the housing and movable relative thereto, means wholly within the chamber and including a spring for effecting combined reciprocatory and oscillatory movement of the driver in response to movement of the shaft, and ratchet means wholly within the chamber and coacting with the driver and the block, a piston operated by the driver adapted to enter the cylindrical bore in the block and force lubricant therefrom during the inward travel of the driver, said piston including a head abutting the bottom of a recess in the driver, resilient means normally and yieldingly holding the block stationary relative to the housing during the inward travel of the driver when the outlet passage in the block is in register with one of the outlets in the housing, and means including said spring for returning the driver and piston, upon completion of the inward travel of the driver, to their initial positions, said spring being disposed between the piston head and the ratchet means, forcing the ratchet means to remain on contact with the block and the piston head in contact with the driver, said ratchet means comprising a disc, having ratchet teeth, slidably attached to the driver and rotating in unison therewith, and pawls in the block, the teeth of the disc sliding past the pawls in the block during the inward travel of the driver, while during the return travel of the driver the teeth grip the pawls and rotate the block to register the block outlet passage with another outlet in the housing.

5. A lubricant distributor comprising a housing defining a chamber and having an inlet and a plurality of outlets communicating with the chamber, a cylinder block rotatably fitted within the chamber having a cylindrical bore in communication with an outlet passage in the block, means to rotate the cylinder block to bring its outlet passage successively in register with each of the outlets in the housing including a driver within the chamber, a shaft projecting from the housing and movable relative thereto, means wholly within the chamber and including a spring for effecting combined reciprocatory and oscillatory movement of the driver in response to movement of the shaft, and ratchet means wholly within the chamber and coacting with the driver and the block, a piston operated by the driver adapted to enter the cylindrical bore in the block and force lubricant therefrom during the inward travel of the driver, said piston including a head abutting the bottom of a recess in the driver, resilient means normally and yieldingly holding the block stationary relative to the housing during the inward travel of the driver when the outlet passage in the block is in register with one of the outlets in the housing, said resilient means comprising a spring-pressed pin in the housing registering with one of a number of recesses in the block, the number of recesses being equal to the number of outlets in the housing, and means including said spring for returning the driver and piston, upon completion of the inward travel of the driver, to their initial positions, said spring being disposed between the piston head and the ratchet means, forcing the ratchet means to remain on contact with the block and the piston head in contact with the driver, said ratchet means comprising a disc, having ratchet teeth, slidably attached to the driver and rotating in unison therewith, and pawls in the block, the teeth of the disc sliding past the pawls in the block during the inward travel of the driver, while during the return travel of the driver the teeth grip the pawls and rotate the block to register the block outlet passage with another outlet in the housing.

6. A lubricant distributor comprising a housing defining a chamber and having an inlet and a plurality of outlets communicating with the chamber, a cylinder block rotatably fitted within the chamber having a cylindrical bore in communication with an outlet passage in the block, means to rotate the cylinder block to bring its outlet passage successively in register with each of the outlets in the housing including a driver within the chamber, a shaft projecting from the housing and movable relative thereto, means wholly within the chamber and including a spring for effecting combined reciprocatory and oscillatory movement of the driver in response to movement of the shaft, and ratchet means wholly within the chamber and coacting with the driver and the block, a piston operated by the driver adapted to enter the cylindrical bore in the block and force lubricant therefrom during the inward travel of the driver, said chamber of the housing being adapted to receive lubricant under pressure by way of the inlet, manually operable means for moving the block toward the driver to effect direct communication between the chamber and all outlets in the housing simultaneously, by-passing the block, and to permit lubricant from the chamber to be discharged from all outlets simultaneously, resilient means normally and yieldingly holding the block stationary relative to the housing during the inward travel of the driver when the outlet passage in the block is in register with one of the outlets in the housing, and means including said spring for returning the driver and piston, upon completion of the inward travel of the driver, to their initial positions, the ratchet means being adapted to rotate the cylinder block during the return travel to register its outlet passage with another outlet in the housing.

7. A lubricant distributor comprising a housing defining a chamber and having an inlet and a plurality of outlets communicating with the chamber, a cylinder block rotatably fitted within the chamber having a cylindrical bore in communication with an outlet passage in the block, means to rotate the cylinder block to bring its outlet passage successively in register with each of the outlets in the housing including a driver within the chamber, a shaft projecting from the housing and movable relative thereto, means wholly within the chamber and including a spring for effecting combined reciprocatory and oscillatory movement of the driver in response to movement of the shaft, and ratchet means wholly within the chamber and coacting with the driver and the block, a piston operated by the driver adapted to enter the cylindrical bore in the block and force lubricant therefrom during the inward travel of the driver, resilient means normally and yieldingly holding the block stationary relative to the housing during the inward travel of the driver when the outlet passage in the block is in register with one of the outlets in the housing, and means including said spring for returning the driver and piston, upon completion of the inward travel of the driver, to their initial positions, said ratchet means comprising a disc slidably attached to the driver and rotating in unison therewith, pawls mounted on the disc, the block having ratchet teeth facing the pawls, the pawls being adapted to slide past the teeth in the block during the inward travel of the driver, while during the return travel of the driver the pawls grip the teeth and rotate the block, the means to hold the block stationary during the inward travel of the driver comprising ratchet teeth on that face of the block opposite the disc, and a counter pawl in the housing engaging the teeth on that face.

CARL F. ERIKSON.

REFERENCES CITED

The following references are of record in the file of this patent:

UNITED STATES PATENTS

| Number | Name | Date |
|---|---|---|
| 2,064,755 | Jakobsen | Dec. 15, 1936 |
| 2,157,970 | Rowland et al. | May 9, 1939 |

FOREIGN PATENTS

| Number | Country | Date |
|---|---|---|
| 7,918 | Great Britain | 1912 |
| 536,869 | France | 1922 |